US012692122B2

(12) United States Patent
Carriero

(10) Patent No.: US 12,692,122 B2
(45) Date of Patent: Jul. 28, 2026

(54) AUTONOMOUS HUMAN-MACHINE-INTERFACE IN THE FORM OF A LANDING OPERATION PANEL OR A LANDING INFORMATION PANEL FOR AN ELEVATOR INSTALLATION

(71) Applicant: Inventio AG, Hergiswil (CH)

(72) Inventor: Stefano Carriero, Cham (CH)

(73) Assignee: INVENTIO AG, Hergiswil (CH)

( * ) Notice: Subject to any disclaimer, the term of this patent is extended or adjusted under 35 U.S.C. 154(b) by 972 days.

(21) Appl. No.: 17/907,281

(22) PCT Filed: Mar. 4, 2021

(86) PCT No.: PCT/EP2021/055408
§ 371 (c)(1),
(2) Date: Sep. 26, 2022

(87) PCT Pub. No.: WO2021/197749
PCT Pub. Date: Oct. 7, 2021

(65) Prior Publication Data

US 2023/0111024 A1 Apr. 13, 2023

(30) Foreign Application Priority Data

Mar. 31, 2020 (EP) .................................... 20166994

(51) Int. Cl.
*B66B 1/30* (2006.01)
*B66B 1/40* (2006.01)

(52) U.S. Cl.
CPC .............. *B66B 1/302* (2013.01); *B66B 1/405* (2013.01)

(58) Field of Classification Search
CPC .......... B66B 1/302; B66B 1/405; B66B 1/461
See application file for complete search history.

(56) References Cited

U.S. PATENT DOCUMENTS 7,040,458 B2 * 5/2006 Forsythe .................. B66B 1/34 187/389
7,377,364 B2 * 5/2008 Tyni ........................ B66B 1/468 187/391

(Continued)

FOREIGN PATENT DOCUMENTS

CN 1759060 A 4/2006
CN 103043512 A 4/2013

(Continued)

*Primary Examiner* — Rina I Duda
(74) *Attorney, Agent, or Firm* — Shumaker, Loop & Kendrick, LLP

(57) ABSTRACT

A human-machine-interface formed as a landing operation panel or a landing information panel for an elevator installation has: an interaction unit (3) that responds to actuation by a passenger to generate input signals and/or to output output signals to be perceived by the passenger; a communication unit that transmits the input signals to an elevator and/or receives the output signals from the elevator controller; and a supply unit that supplies electrical energy to the interaction unit and the communication unit, the supply unit having an energy conversion unit and an electricity storage unit, wherein the energy conversion unit converts kinetic energy available in the immediate surroundings of the human-machine-interface into electrical energy, and wherein the electricity storage unit stores the converted (Continued)

electrical energy. The human-machine-interface operates with energy autonomy, i.e. without a supply cable to a central power supply.

16 Claims, 3 Drawing Sheets

(56) References Cited

U.S. PATENT DOCUMENTS

| | | | | |
|---|---|---|---|---|
| 7,681,694 | B2 * | 3/2010 | Aulanko | B66B 1/308 187/277 |
| 8,356,698 | B2 | 1/2013 | Zepke et al. | |
| 8,540,057 | B2 * | 9/2013 | Schuster | B66B 1/3423 187/247 |
| 8,544,612 | B2 * | 10/2013 | Korhonen | G07C 9/27 187/387 |
| 10,239,728 | B2 * | 3/2019 | Finn | B66B 1/3476 |
| 2001/0017240 | A1 | 8/2001 | Araki et al. | |
| 2002/0023802 | A1 | 2/2002 | Ayano et al. | |
| 2011/0025064 | A1 * | 2/2011 | Park | F03D 80/00 290/50 |
| 2014/0116810 | A1 * | 5/2014 | Vrankovic | B66B 1/302 187/290 |
| 2015/0122589 | A1 * | 5/2015 | Mezzadri | B66B 1/302 187/290 |
| 2015/0203328 | A1 * | 7/2015 | Horbrugger | H02J 7/0068 318/504 |
| 2017/0137259 | A1 * | 5/2017 | Jacobs | B66B 1/308 |

FOREIGN PATENT DOCUMENTS

| | | | | |
|---|---|---|---|---|
| CN | 104140026 | A | 11/2014 | |
| CN | 204231102 | U | 3/2015 | |
| CN | 105673332 | A | 6/2016 | |
| CN | 107337036 | A | 11/2017 | |
| CN | 208500078 | U | 2/2019 | |
| CN | 110002288 | A | 7/2019 | |
| EP | 1522519 | A1 | 4/2005 | |
| EP | 2530044 | A1 | 12/2012 | |
| KR | 101488792 | B1 | 2/2015 | |
| WO | 2004094288 | A1 | 11/2004 | |
| WO | 2006063243 | A2 | 6/2006 | |
| WO | 2006088467 | A2 | 8/2006 | |
| WO | WO-2016156432 | A1 * | 10/2016 | F03D 9/25 |

* cited by examiner

3 INTERACTION UNIT 5 COMMUNICATION UNIT
9 INPUT UNIT 11 SENSOR 13 OUTPUT UNIT 15 DISPLAY
17 LOGIC UNIT 19 TRANSCEIVER UNIT
21 POWER MANAGEMENT UNIT 23 ENERGY CONVERSION UNIT
25 ELECTRICITY STORAGE UNIT 29 GENERATOR
31 ACCUMULATOR 33 SUPERCAPACITOR 91 TRANSCEIVER

AUTONOMOUS HUMAN-MACHINE-INTERFACE IN THE FORM OF A LANDING OPERATION PANEL OR A LANDING INFORMATION PANEL FOR AN ELEVATOR INSTALLATION

FIELD

The present invention relates to a human-machine-interface in the form of a landing operation panel or a landing information panel for an elevator installation. The invention further relates to an elevator installation having such a human-machine-interface.

BACKGROUND

In elevator installations, typically at least one elevator car can be moved in an elevator shaft between height levels of different landings. A drive machine moving the elevator car is controlled by an elevator controller. If necessary, the elevator controller can also control other functionalities of the elevator installation.

Human-machine-interfaces in the form of landing operation panels (LOP) and/or landing information panels (LIP) are typically provided on each of the landings.

With the help of a landing operation panel, a passenger can enter information in the form of an input signal to the elevator installation. For example, by pressing a button on the landing operation panel, the passenger can enter a call signal to signal that he wants the elevator car to be moved to the landing where he is waiting. The input signal should then be forwarded to the elevator controller so that it can cause the elevator car to be moved to the desired landing.

A landing information panel can be used to output information, which is to be reproduced by output signals, to passengers in a manner able to be perceived by said the passengers. For example, a suitable indication on a display or an acoustic announcement can be used to provide information as to where the elevator car is currently located or how long a waiting time is likely to be. The information to be output, that is to say for example where the elevator car is currently located, can be provided by the elevator controller and transmitted to the landing information panel.

In conventional elevator installations, each of the multiplicity of landing operation panels and landing information panels to be provided on the different landings is typically connected to a central power supply and/or to the elevator controller via cables. Effort to lay a large number of cables required for this purpose when assembling an elevator installation, as well as material expenditure necessary in this context, can be considerable.

SUMMARY

Among other things, there may be a need for an elevator installation in which the assembly effort and/or the material expenditure is reduced. Furthermore, there may be a need for a human-machine-interface which can be used as a landing operation panel or landing information panel in an elevator installation and which makes it possible to reduce the effort involved when installing it.

A need of this kind can be met by the human-machine-interface and the elevator installation according to any of the advantageous embodiments defined in the following description.

According to a first aspect of the invention, a human-machine-interface in the form of a landing operation panel or a landing information panel for an elevator installation is proposed. The human-machine-interface has at least one interaction unit, one communication unit, and one supply unit. The interaction unit is configured to generate input signals in response to an actuation by a passenger and/or to output output signals in a manner able to be perceived by the passenger. The communication unit is configured to transmit the input signals to an elevator controller and/or to receive the output signals from the elevator controller. The supply unit is configured to supply electrical energy to the interaction unit and the communication unit. In this case, the supply unit comprises at least one energy conversion unit and one electricity storage unit. The energy conversion unit is configured to convert non-electrical energy, such as mechanical energy, that is available in the immediate surroundings of the human-machine-interface into electrical energy. The electricity storage unit is configured to store the electrical energy converted by the energy conversion unit.

According to a second aspect of the invention, an elevator installation is proposed, which has an elevator shaft, an elevator car, a drive machine for moving the elevator car in the elevator shaft between levels of different landings, an elevator controller for controlling functionalities of the elevator installation in response to input signals and for outputting output signals as information about a current state in the elevator installation, and a human-machine-interface according to an embodiment of the first aspect of the invention.

Possible features and advantages of embodiments of the invention can be considered, inter alia and without limiting the invention, to be based upon the concepts and findings described below.

With regard to its functionalities and/or structurally, the human-machine-interface proposed here can be designed in a largely similar manner to conventional human-machine-interfaces for elevator installations. In particular, the interaction unit can be configured to interact with passengers and to receive information to be transmitted by the passengers as input signals in order to then be able to forward it to the elevator controller, or to receive information to be transmitted to the passengers from the elevator controller and then to output it to the passengers.

In an embodiment as a landing operation panel, the human-machine-interface can have, for example, one or more buttons that can be actuated by passengers to signal to the elevator installation that the elevator car should be moved to the landing of the passengers and/or in which direction a passenger wants to be moved with the elevator car. Instead of buttons, other sensors or interfaces can also be used, via which passengers can enter their call signal. For example, capacitive sensors can be provided, which passengers can activate by lightly touching them. Sensor circuits can also be used, which passengers can specifically activate or actuate, for example with a key, an RFID chip, a smartphone, or another technical device.

In an embodiment as a landing information panel, the human-machine-interface can have a display such as an LED display, a screen, or the like, with the help of which information relating to the elevator installation can be presented to a passenger. As an alternative or in addition to such a visual representation of information, information can also be output in a different way, for example acoustically via a loudspeaker. With the help of the landing information panel, the elevator installation can thus inform passengers, for example, about the current location of the elevator car.

In order to be able to forward the input signals entered by a passenger from the human-machine-interface to the elevator controller and/or to be able to forward output signals containing information about the elevator installation from the elevator controller to the human-machine-interface, the human-machine-interface is provided with a communication unit. The communication unit can exchange the input signals or the output signals between the communication partners and, if necessary, preprocess them in a suitable manner.

In an elevator installation according to the second aspect of the invention, at least one of the human-machine-interfaces proposed herein can be arranged on each of the different landings. At least one landing operation panel and/or one landing information panel is preferably provided on each of the landings served by the elevator installation. Thus, on each landing, the passengers arriving there can be provided with information relating to the elevator installation, and information to be transmitted by the passengers, in particular call requests, can be recorded.

A central principle on which the human-machine-interface proposed here is based can be seen in equipping it with a special supply unit which supplies other components of the human-machine-interface with electrical energy. The supply unit can be designed on the one hand to be able to generate electrical energy by converting other forms of energy available in the immediate surroundings of the human-machine-interface, and on the other hand to be able to store this electrical energy at least temporarily.

For this purpose, the supply unit has the energy conversion unit, which is able to convert non-electrical forms of energy such as kinetic energy, thermal energy, electromagnetic energy such as light, or other forms of energy into electrical energy. Furthermore, the supply unit has the electricity storage unit, with the help of which converted electrical energy can be stored and released again at a later point in time.

In this case, the human-machine-interface can be configured to operate exclusively on the basis of the electrical energy provided by the supply unit.

In other words, the human-machine-interface can be designed in such a way that the entire electrical energy required for its operation can be provided by the supply unit in sufficient quantity and with sufficient reliability. For this purpose, on the one hand, the supply unit can be designed with sufficient power to provide sufficient electrical energy. On the other hand, the other components of the human-machine-interface, such as in particular its interaction unit and its communication unit, can be designed to be particularly energy-saving. In this way, it can be achieved that the entire human-machine-interface with its electrically operating components can be served solely by the supply unit during operation.

Accordingly, the proposed human-machine-interface does not need to have any cable connections via which electrical energy coming from a central energy supply would be distributed to various human-machine-interfaces within the elevator installation. Instead, the proposed human-machine-interface can be operated with energy autonomy, that is to say generate the electrical energy it needs itself by locally converting energy that is available in the form of other forms of energy in its immediate surroundings, independently of an external power grid.

The elevator installation according to the second aspect of the invention can hereby be devoid of power lines for supplying electrical energy to each of the human-machine-interfaces. Instead, the human-machine-interface is not provided with electrical energy from the outside, but rather generates it internally. This avoids the effort that would otherwise be necessary to lay many, possibly long, cables within the elevator installation in order to be able to supply its many human-machine-interfaces for its operation with electrical energy from a central supply source. As a result, assembly and/or maintenance of the elevator installation can be simplified considerably. Material expenditure for supply cables and the associated costs can also be avoided.

In this case, the human-machine-interface can be arranged in the elevator installation, for example on a frame of a landing door which separates the elevator shaft from a landing corridor.

Landing doors are provided on elevator installations at a transition between a landing corridor and the elevator shaft and can be opened or closed as required. They are used in elevator installations, among other things, to prevent passengers coming from a landing corridor from falling into the elevator shaft if there is no elevator car waiting on the affected landing. For this purpose, a landing door typically has a frame that is fixed to the building and door leaves that can move relative to the frame. One or more landing operation panels and landing information panels can be attached to the frame or integrated into the frame.

As a result, the human-machine-interface can be easily installed in the elevator installation together with the landing door, for example, and the human-machine-interface with its energy conversion unit can be installed both in the vicinity of an inner volume of the elevator shaft and in the vicinity of a volume adjacent to the landing door on an opposite side from a landing corridor. The energy conversion unit can thus use any energy available in both volumes and convert it into electrical energy.

In general, the energy conversion unit of the supply unit can be designed in different ways and can use different energy sources in order to generate the required electrical energy from them.

For example, it would be conceivable to design the energy conversion unit with the help of photovoltaic elements, that is to say solar cells. The photovoltaic elements could, for example, convert the natural or artificial light that is available in the surroundings of the elevator installation into electrical energy.

Alternatively, the energy conversion unit could be designed to convert thermal energy into electrical energy. For this purpose, it could have thermocouples which, for example, could use temperature differences in the elevator installation or in regions adjacent to the elevator installation in order to generate electrical energy from them.

As a further alternative, the energy conversion unit could convert mechanical energy into electrical energy. For this purpose, piezo elements could be provided, for example, which convert pressure exerted on them into electrical energy. The pressure could be generated by passengers, for example, when they press a button on a landing operation panel or when they apply a load on the landing in front of the elevator installation while waiting for the elevator car.

In a preferred embodiment of the human-machine-interface presented, the energy conversion unit has a wind turbine to be set in rotation by a flow of air and a generator coupled to a shaft of the wind turbine.

In other words, the energy conversion unit can have a small wind turbine. Such a wind turbine can also be referred to as a windmill with a corresponding structural configuration. The wind turbine is designed to be rotated by an impinging flow of air, that is to say a current of moving air. For this purpose, the wind turbine can have turbine blades which are subjected to the flow of air, as a result of which a torque is exerted on the entire wind turbine. Due to this torque, the wind turbine rotates about an axis of rotation.

The shaft of the wind turbine runs along this axis of rotation or coaxially with this axis of rotation.

The kinetic energy inherent in the rotating wind turbine can thus be transmitted via the shaft to the generator coupled to the shaft. This generator is designed to at least partially convert the kinetic energy into electrical energy. For this purpose, for example, magnetic fields rotating with the shaft can be used in the generator in order to induce electrical currents in coils.

The electrical energy associated with these electrical currents can then be supplied within the human-machine-interface to other components, in particular to the electricity storage unit and/or to the interaction unit and the communication unit.

According to a more specific embodiment, the wind turbine can be accommodated in a duct element to be arranged between an elevator shaft and a landing corridor.

In other words, the wind turbine of the energy conversion unit can be arranged in a duct element which can be arranged in an elevator installation in such a way that it connects the elevator shaft to an adjacent building landing in such a way that air can circulate through this duct element from the elevator shaft to the building landing or in the opposite direction.

For this purpose, the duct element can be designed as a tube, for example, within which the wind turbine can be accommodated. A direction of longitudinal extent of the duct element can be coaxial with an axis of rotation of the wind turbine. Turbine blades of the wind turbine can run transversely to the direction of longitudinal extent of the duct element, so that a flow of air moving through the duct element hits these turbine blades via ducts and thus efficiently sets the wind turbine in rotation.

In an elevator installation according to the second aspect of the invention, the wind turbine can be arranged in a passage duct between the elevator shaft and a landing corridor adjacent to the human-machine-interface.

In this case, the passage duct can connect an inner volume within the elevator shaft with an outer volume, for example within a landing corridor adjacent to the elevator shaft, in such a way that air can circulate between the two volumes. The circulating air can then drive the wind turbine arranged in the passage duct. In this case, the wind turbine can be accommodated, for example, in the aforementioned duct element and this duct element can in turn be arranged in the passage duct. The passage duct can be, for example, a passage opening in a frame of a landing door.

In the approach presented, use can be made of the fact that, particularly in the case of tall buildings with long elevator shafts, there is usually an air pressure difference between the inner volume in the elevator shaft and the adjacent outer volume on the landing. In the building, on landings further down, the air pressure in the elevator shaft is typically lower than in the surrounding landing, whereas on landings located further up, the air pressure in the elevator shaft is typically greater than in the surrounding landing there.

Accordingly, a total air flow is often observed, which flows into the elevator shaft in the landings located further down and flows out again from the elevator shaft on the landings located further up. The total air flow can be influenced by the temperature conditions and/or air pressure conditions otherwise prevailing in the building and can optionally flow through the building in the opposite direction.

The total air flow can be guided or channeled at each of the landings preferably through the passage duct provided there between the landing corridor and the elevator shaft and drive the wind turbine provided therein. Overall, the air pressure differences prevailing in the building and the air flows resulting therefrom can be used in order to locally convert the kinetic energies contained therein into electrical energy with the help of the wind turbine in the energy conversion unit.

The electrical energy provided by the energy conversion unit can then, if required, be made available to other components of the human-machine-interface as consumers.

However, since it can be assumed that the energy conversion unit cannot always provide sufficient electrical energy or power to meet a current power requirement of these components, the human-machine-interface also has the electricity storage unit. The electrical energy provided can be stored at least temporarily in this electricity storage unit.

According to one embodiment, the electricity storage unit may include an accumulator.

Such an accumulator is sometimes also referred to as a rechargeable battery. An accumulator can reversibly convert electrical energy into chemical energy. This chemical energy can be stored and converted back into electrical energy when needed. Accumulators can store sufficiently large amounts of energy to be able to supply the human-machine-interface with electricity autonomously. In this case, accumulators can be provided relatively inexpensively and work reliably over long periods of operation.

Alternatively or additionally, the electricity storage unit can have a supercapacitor.

Supercapacitors are sometimes also referred to as supercaps or ultracapacitors. Supercapacitors are electrochemical capacitors. Compared to accumulators of the same weight, supercapacitors typically have a significantly lower energy density, but their power density is around 10 to 100 times greater. Supercapacitors can therefore be charged and discharged much faster. They also withstand many more switching cycles than is typically the case with accumulators.

According to one embodiment, the communication unit is configured to wirelessly exchange the input signals and/or the output signals with the elevator controller. In the case of the elevator installation equipped with the human-machine-interface, the elevator controller and the human-machine-interface can be configured to wirelessly exchange the input signals and the output signals with one another.

In other words, the proposed human-machine-interface may not only do without obtaining its electrical energy via cables that have to be laid over a wide area, but data communication or signal communication can also be implemented wirelessly. For this purpose, both the communication unit of the human-machine-interface and the elevator controller can have transmission and reception modules, with the help of which the input signals and output signals can be exchanged between the two communication partners. The wireless exchange of data or signals can take place in the form of electromagnetic waves, that is to say via radio for example. Different wireless communication technologies and/or communication protocols can be used depending on the distances to be covered between the communication partners and/or the amounts of data and signals to be transmitted. The use of wireless communication means that complex wiring between each of the human-machine-interfaces on the one hand and the central elevator controller on the other hand can be dispensed with.

As already indicated above, the human-machine-interface and the units used therein can also be optimized in such a way that as little electrical energy as possible is consumed during the operation thereof.

According to one embodiment, the communication unit can be configured, for example, to become active exclusively in response to an input of an input signal.

In other words, consumption of electrical energy in the human-machine-interface can be reduced in that, in particular, its communication unit is activated only when required and is otherwise in a sleep mode, for example.

Whether there is currently a need can be recognized, for example, by the fact that an input signal is detected by the human-machine-interface. In order to detect such an input signal, the human-machine-interface can use the interaction unit thereof in particular. This interaction unit can have a sensor system, with the help of which it can be detected when a passenger wishes to transmit an input signal.

For example, a button on a landing operation panel can be actuated by the passenger and this can be detected as an input signal, whereupon the communication unit can be activated in order to ultimately transmit the input signal to the elevator controller, for example.

The sensors can also be implemented in a different way or at a different location. For example, in addition to an output unit such as a display, a landing information panel can also have a sensor system, with the help of which, for example, the presence of a passenger waiting in front of the elevator installation can be detected. The detection of the passenger can be interpreted as an input signal and in turn trigger the activation of the communication unit.

Overall, this means that the communication unit can only be operated when it is needed and can otherwise be taken out of operation to save power.

Further measures can be taken in the human-machine-interface in order to minimize its electrical energy consumption. For example, low power technologies can be used in the communication unit. For example, sensors or displays with particularly low power consumption can also be used in the interaction unit.

Overall, various advantages for the elevator installation equipped with it can be achieved through the use of the energy-autonomous human-machine-interface proposed herein. For example, an installation outlay during the construction of the elevator installation or also a maintenance effort to be carried out during its operation can be significantly lower than in conventional elevator installations, since no long power cables need to be laid or maintained within the elevator installation to a central power supply. In addition, if wireless communication is established between the human-machine-interface and the elevator controller, the otherwise necessary signal transmission cables can also be dispensed with. The costs for such power cables or signal transmission cables can also be avoided as a result. In addition, there is less overall consumption of electrical energy to be supplied externally for the elevator installation, since the landing operation panels and landing information panels of the elevator installation are self-supplying and therefore do not need to be supplied from a central power supply.

It must be noted that some of the possible features and advantages of the invention are described herein with reference to different embodiments of the human-machine-interface and the elevator installation equipped with said human-machine-interface. A person skilled in the art will recognize that the features can be suitably combined, adapted, or replaced in order to arrive at further embodiments of the invention.

Embodiments of the invention will be described below with reference to the attached drawings; neither the drawings nor the description should be interpreted as limiting the invention.

The drawings are merely schematic and not true to scale. In the various figures, identical reference signs refer to features which are identical or have an identical function.

DETAILED DESCRIPTION

Figure 1:
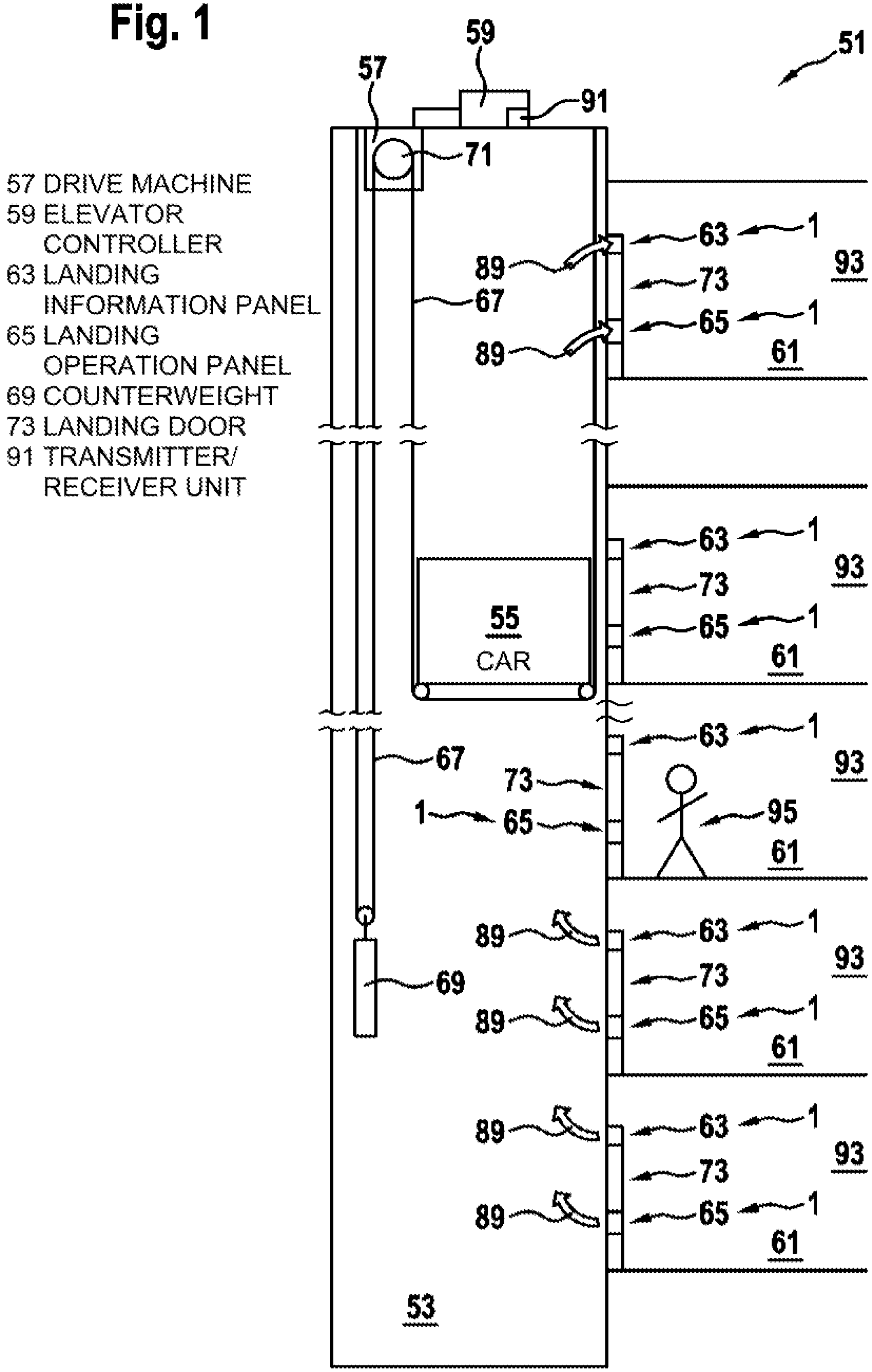
FIG. 1 is a sectional view through an elevator installation according to an embodiment of the present invention.

FIG. 1 shows an elevator installation 51 according to one embodiment of the present invention. The elevator installation 51 comprises an elevator shaft 53 in which an elevator car 55 and a counterweight 69 can be moved in the vertical direction between different landings 61. The elevator car 55 and the counterweight 69 are held by cable-like suspension means 67. The cable-like suspension means 67 can be moved with the help of a traction sheave 71 of a drive machine 57, and in this way the elevator car 55 and the counterweight 69 can be moved in opposite directions. The drive machine 57 is controlled by an elevator controller 59.

A landing door 73 separating an inner volume in the elevator shaft 53 from an outer volume in a landing corridor 93 of each landing 61 is provided on each of the landings 61.

Human-machine-interfaces 1 in the form of a landing information panel 63 and a landing operation panel 65 are provided on each of the landing doors 73.

With the help of the landing information panel 63, the landing on which the elevator car 55 is currently located can be shown to a passenger 95, for example. For this purpose, the landing information panel 63 can, for example, output output signals which it receives from the elevator controller 59 in a manner able to be perceived by the passenger 95.

The landing operation panel 65 can be operated by the passenger 95 in order to call the elevator car 55 to his landing 61, for example. Upon actuation, the landing operation panel 65 can generate a corresponding input signal and forward it to the elevator controller 59.

Figure 2:
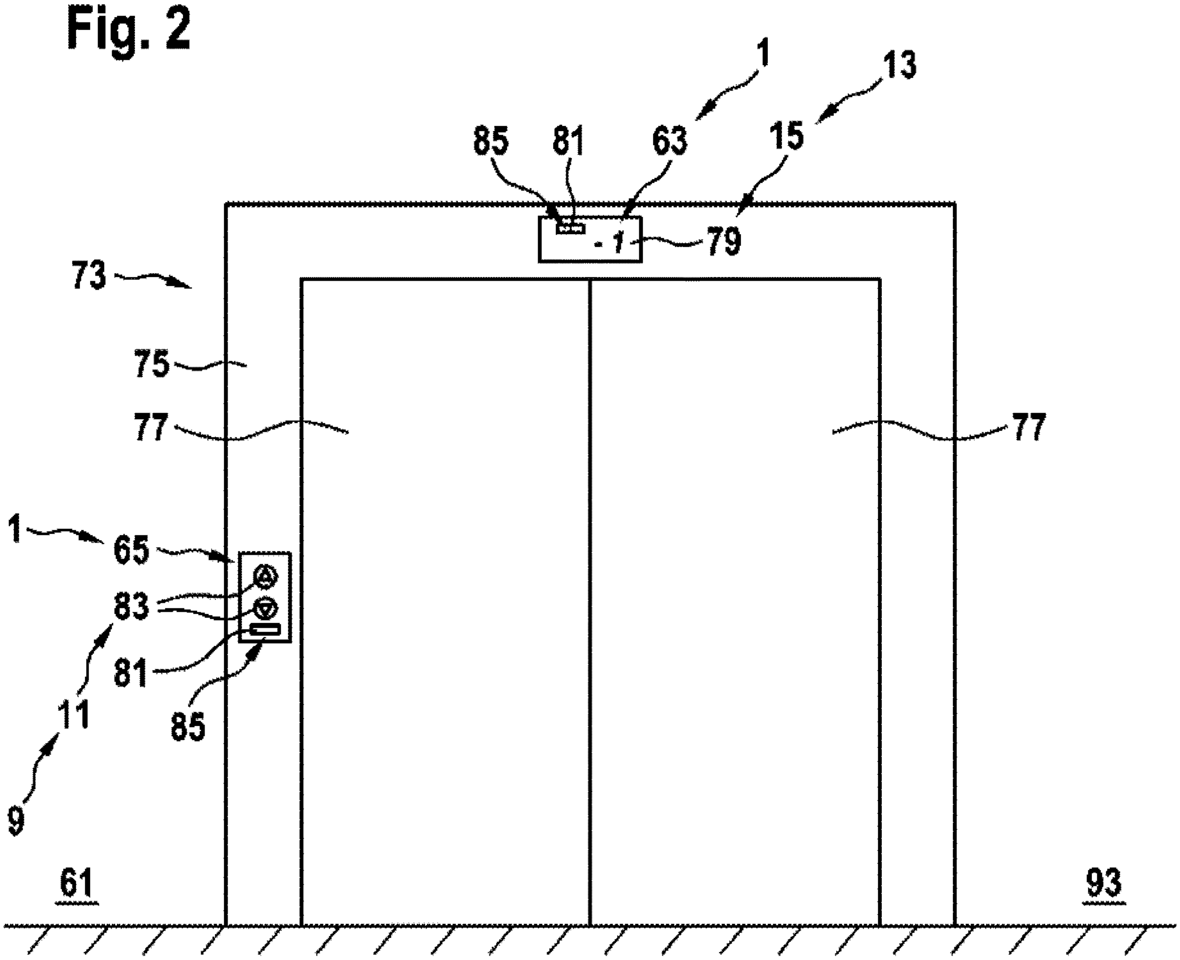
FIG. 2 is a front view of a landing door having human-machine-interfaces according to one embodiment of the present invention.

FIG. 2 shows a landing door 73 on a landing 61 or in a landing corridor 93. The landing door 73 has a door frame 75 and two door leaves 77 that can be moved relative to this door frame 75 and can therefore be opened and closed.

A human-machine-interface 1 in the form of a landing information panel 63 is arranged in the door frame 75 above the door leaves 77. The landing information panel 63 has an output unit 13 in the form of a display 15 which can be formed with the help of an LED matrix 79, for example. The output unit 13 can, for example, display information about the landing 61 on which the elevator car 55 is currently located.

An air slot 81 can also be seen on the landing information panel 63, which air slot opens into a passage duct 85 which extends through the door frame 75. The passage duct 85 thus connects the outer volume within the landing corridor 93 to the inner volume within the elevator shaft 53.

A further human-machine-interface 1 in the form of a landing operation panel 65 is provided in the door frame 75 laterally next to the door leaves 77. The landing operation panel 65 has two buttons 83 which can be actuated by the passenger 95 in order to call the elevator car 55, for example. The buttons 83 each act as sensors 11 of an input unit 9. By pressing a button 83, the passenger 95 can thus generate an input signal, which can then be forwarded from the human-machine-interface 1 to the elevator controller 59, so that the latter can move the elevator car 55 to the desired landing 61. An air slot 81 is also provided on the landing operation panel 65 and opens into a passage duct 85.

Figure 3:
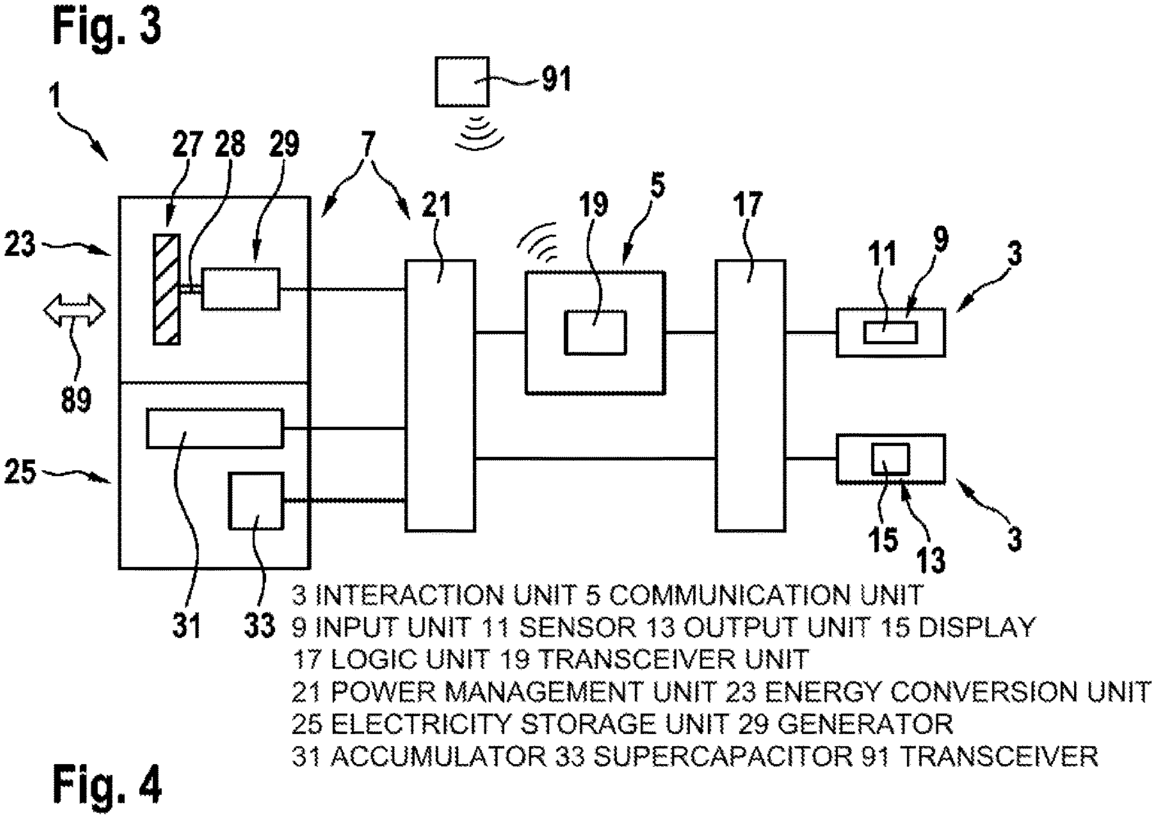
FIG. 3 is a schematic representation of a human-machine-interface according to an embodiment of the present invention.

FIG. 3 schematically shows an exemplary structure of a human-machine-interface 1. The human-machine-interface 1 has an interaction unit 3, a communication unit 5, and a supply unit 7.

Depending on whether the human-machine-interface 1 is designed as a landing information panel 63 or as a landing operation panel 65 or as a combination of both panel types, the interaction unit 3 can have different components.

For example, an input unit 9 can be provided in the interaction unit 3 via which the passenger 95 can generate input signals in order to transmit information to the elevator installation 51. The input unit 9 can comprise a sensor 11, for example, which can detect an actuation or a touch by the passenger 95.

Alternatively or additionally, an output unit 13 can be provided in the interaction unit 3, via which information can be output to the passenger 95. For this purpose, the output unit 13 can, for example, comprise a display 15 in order to be able to output the information as an output signal in a manner able to be perceived by the passenger 95. Alternatively, the output unit 13 can also present the information in a different way, for example in the form of an acoustic output, and for this purpose can have a loudspeaker, for example.

The human-machine-interface 1 also comprises a logic unit 17, with the help of which the input signals and/or output signals can be processed, for example. For this purpose, the logic unit 17 can have, for example, a data processing unit with a processor (CPU) and possibly a data storage unit.

The communication unit 5 serves to exchange the input signals and/or output signals with the elevator controller 59, for example. For this purpose, the communication unit 5 has a preferably wireless transceiver unit 19. This transmitter/receiver unit 19 can transmit the various signals, for example as radio signals, to a further transmitter/receiver unit 91 on the elevator installation 59 (see also FIG. 1) or receive them from it.

The supply unit 7 of the human-machine-interface 1 has an energy conversion unit 23 and an electricity storage unit 25 as well as a power management unit 21.

The energy conversion unit 23 is designed to convert energy that is available in a non-electrical form in the immediate surroundings of the human-machine-interface 1 into electrical energy. The electrical energy can then be forwarded to the power management unit 21. The power management unit 21 can partially or completely forward this electrical energy directly to energy-consuming components of the human-machine-interface 1 such as the communication unit 5, the interaction units 3, and/or the logic unit 17. Alternatively or additionally, the power management unit 21 can partially or completely forward the electrical energy to the electricity storage unit 25, in which the electrical energy can be temporarily stored and, if necessary, can be called up again at a later point in time by the power management unit 21 and can be made available to the other components of the human-machine-interface 1.

In the example shown, the energy conversion unit 23 is designed to convert kinetic energy in the form of a flow of air 89 into electrical energy. For this purpose, the energy conversion unit 23 has a small wind turbine 27 which is set in rotation by the flow of air 89. A shaft 28 of the wind turbine 27 rotating about an axis of rotation is connected to a generator 29. The generator 29 generates an electrical current due to the rotation. If necessary, the electrical current can be rectified in the power management unit 21 or with the help of a rectifier to be additionally provided.

Furthermore, in the example shown, the electricity storage unit 25 is equipped with an accumulator 31 and/or a supercapacitor 33 in order to be able to store the electrical energy made available by the energy conversion unit 23.

Figure 4:
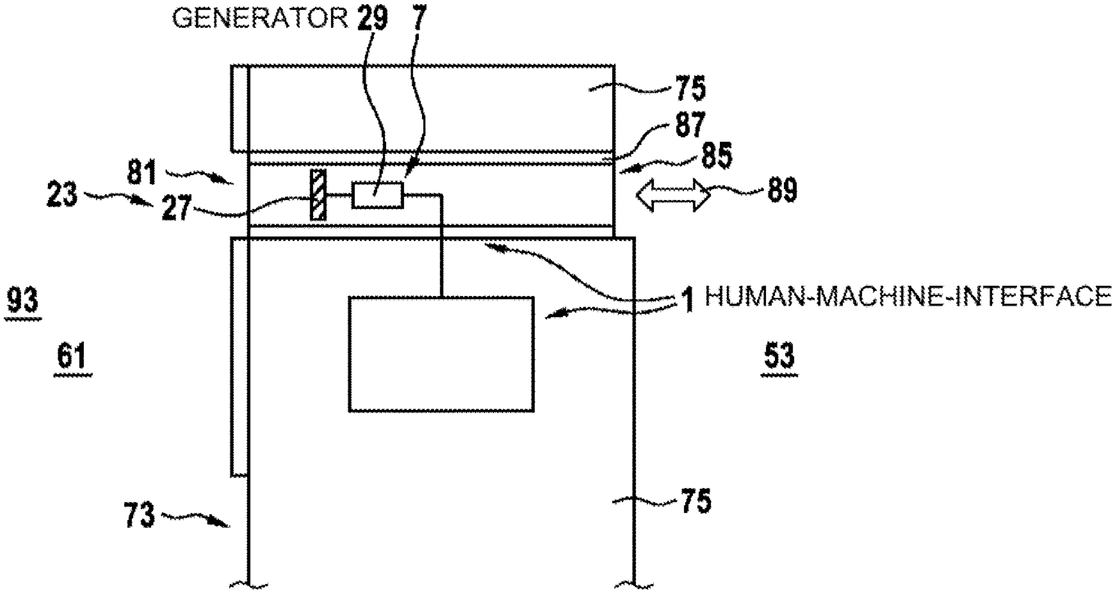
FIG. 4 is a sectional view through a door frame of a landing door with a human-machine-interface arranged therein according to an embodiment of the present invention.

FIG. 4 shows how the human-machine-interface 1 can be arranged in the frame 75 of the landing door 73. A passage duct 85 can be provided in the frame 75. A duct element 87 in the form of a tube, for example, can be integrated in the passage duct 85. The wind turbine 27 and the generator 29 of the energy conversion unit 23 are then in turn accommodated in the duct element 87. The wind turbine 27 is arranged in such a way that a flow of air 89 flowing through the duct element 87 causes it to rotate.

As indicated in FIGS. 1 and 4, the flow of air 89 can be caused by pressure differences that can prevail within a building between the outer volumes of the landing corridors 93 and the inner volume of the elevator shaft 53. Typically, on lower landings 61, a flow of air 89 flows from a landing corridor 93 there into the elevator shaft 53, and then on upper landings 61 it flows again as a flow of air 89 from the elevator shaft 53 into the landing corridors 93 there. The flow of air 89 can be caused, for example, by the difference in height within the elevator shaft 53 and/or by different temperatures within the building. Movements of the elevator car 55 within the elevator shaft 53 can also cause a flow of air 89.

Overall, it is assumed that on each of the landings 61 a flow of air 89 flows through energy conversion units 23 of human-machine-interfaces 1 located there with sufficient frequency in order to be able to provide sufficient energy for operating the entire human-machine-interface 1 after conversion into electrical energy.

Each of the human-machine-interfaces 1 can thus work with energy autonomy. It is therefore not necessary to lay supply cables, for example from a central energy supply, to each of the human-machine-interfaces 1.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A human-machine-interface being a landing operation panel or a landing information panel for an elevator installation, the human-machine-interface comprising:

an interaction unit that responds to actuation by a passenger by at least one of generating input signals and outputting output signals that can be perceived by the passenger;

a communication unit that transmits the input signals to an elevator controller and/or receives the output signals from the elevator controller;

a supply unit that supplies electrical energy to the interaction unit and to the communication unit;

a duct element through which air flows between an elevator shaft and a landing corridor in the elevator installation, the landing corridor being adjacent to the human-machine-interface; and wherein the supply unit has an energy conversion unit and an electricity storage unit, wherein the energy conversion unit converts kinetic energy available from the flow of air in the duct element into electrical energy, and wherein the electricity storage unit stores the electrical energy converted by the energy conversion unit.

2. The human-machine-interface according to claim 1 operating solely on the electrical energy provided by the supply unit.

3. The human-machine-interface according to claim 1 wherein the energy conversion unit includes a wind turbine rotated by the flow of air and a generator coupled to a shaft of the wind turbine, wherein the kinetic energy is generated from the flow of air.

4. The human-machine-interface according to claim 3 wherein the wind turbine is accommodated in the duct element arranged in the elevator installation between the elevator shaft and the landing corridor.

5. The human-machine-interface according to claim 1 wherein the electricity storage unit includes an accumulator.

6. The human-machine-interface according to claim 1 wherein the electricity storage unit includes a supercapacitor.

7. The human-machine-interface according to claim 1 wherein the communication unit wirelessly exchanges the input signals and/or the output signals with the elevator controller.

8. The human-machine-interface according to claim 1 wherein the communication unit becomes active exclusively in response to an input of one of the input signals.

9. An elevator installation comprising:

an elevator shaft;

an elevator car;

a drive machine for moving the elevator car in the elevator shaft between levels of different landings;

an elevator controller controlling functionalities of the elevator installation in response to input signals and for outputting output signals as information about a current state in the elevator installation; and the human-machine-interface according to claim 1 in communication with the elevator controller.

10. The elevator installation according to claim 9 wherein at least one of the human-machine-interface is arranged on each of the different landings.

11. The elevator installation according to claim 10 being devoid of power lines for supplying electrical energy to the human-machine-interfaces.

12. The elevator installation according to claim 9 wherein the human-machine-interface is arranged on a door frame of a landing door the separates the elevator shaft from a landing corridor at one of the different landings.

13. The elevator installation according to claim 12 being devoid of power lines for supplying electrical energy to the human-machine-interface.

14. The elevator installation according to claim 9 wherein the energy conversion unit of the human-machine-interface includes a wind turbine rotated by the flow of air and a generator coupled to a shaft of the wind turbine, and wherein the wind turbine is arranged in the duct element providing fluid communication between the elevator shaft and the landing corridor adjacent to the human-machine-interface.

15. The elevator installation according to claim 9 wherein the elevator controller and the human-machine-interface wirelessly exchange the input signals and the output signals with one another.

16. A human-machine-interface being a landing operation panel or a landing information panel for an elevator installation, the human-machine-interface comprising:

a panel facing a landing corridor, the panel having an air slot formed therein open to the landing corridor, the air slot being connected to a duct open to an elevator shaft of the elevator installation;

an interaction unit at the panel that responds to actuation by a passenger by at least one of generating input signals and outputting output signals that can be perceived by the passenger;

a communication unit that transmits the input signals to an elevator controller and/or receives the output signals from the elevator controller;

a supply unit that supplies electrical energy to the interaction unit and to the communication unit; and wherein the supply unit has an energy conversion unit and an electricity storage unit, wherein the energy conversion unit converts kinetic energy from air flowing through the air slot and the duct into electrical energy, and wherein the electricity storage unit stores the electrical energy converted by the energy conversion unit.

* * * * *